(12) United States Patent
Sidbury (10) Patent No.: US 9,191,482 B1
(45) Date of Patent: Nov. 17, 2015

(54) WATCH, MOBILE TELEPHONE AND VIDEO CAMERA SYSTEM

(71) Applicant: David Sidbury, Wilmington, NC (US)

(72) Inventor: David Sidbury, Wilmington, NC (US)

(*) Notice: Subject to any disclaimer, the term of this patent is extended or adjusted under 35 U.S.C. 154(b) by 0 days.

(21) Appl. No.: 14/609,847

(22) Filed: Jan. 30, 2015

(51) Int. Cl.
  H04M 1/00 (2006.01)
  H04M 1/725 (2006.01)
  H04M 1/04 (2006.01)
  H04M 1/02 (2006.01)
  H04M 1/22 (2006.01)
  H04M 1/03 (2006.01)

(52) U.S. Cl.
  CPC .......... *H04M 1/7253* (2013.01); *H04M 1/0264* (2013.01); *H04M 1/0266* (2013.01); *H04M 1/03* (2013.01); *H04M 1/04* (2013.01); *H04M 1/22* (2013.01); *H04M 1/7258* (2013.01)

(58) Field of Classification Search
  CPC ........... H04M 1/7253; H04M 1/0266; H04M 1/0264; H04M 1/04; H04M 1/03; H04M 1/22; H04M 1/7258
  USPC ........ 455/556.1, 3.06, 66.1, 74.1, 556.2, 557, 455/344; 248/114–115, 442
  See application file for complete search history.

(56) References Cited

U.S. PATENT DOCUMENTS

| | | | |
|---|---|---|---|
| 6,535,605 B1 | 3/2003 | Ghassabian | |
| 6,707,764 B2 | 3/2004 | Davidson et al. | |
| 6,801,476 B2 | 10/2004 | Gilmour | |
| 7,280,844 B2 | 10/2007 | Ikeda et al. | |
| D565,427 S | 4/2008 | Ellner et al. | |
| 7,424,316 B1 | 9/2008 | Boyle | |
| 7,509,094 B2 | 3/2009 | Moran et al. | |
| 8,725,842 B1* | 5/2014 | Al-Nasser | 709/219 |
| 2003/0125077 A1 | 7/2003 | Lee et al. | |
| 2003/0155389 A1 | 8/2003 | Swartzentruber | |
| 2003/0194084 A1 | 10/2003 | Gilmour | |
| 2009/0051649 A1* | 2/2009 | Rondel | 345/156 |
| 2015/0085317 A1* | 3/2015 | Kim et al. | 358/1.15 |
| 2015/0215443 A1* | 7/2015 | Heo et al. | 455/556.1 |

* cited by examiner

*Primary Examiner* — Shahriar Behnamian (57) ABSTRACT

A titanium watch, mobile telephone, and video camera system features a base unit constructed from titanium with a screen unit pivotally located on a base top surface. A time display component is located on a screen top surface. A mobile telephone unit is located in the base unit having an illuminated dial pad and a plurality of function keys. The system features a microphone, a universal serial bus (USB) and charger port, a flash drive, and a first side cover pivotally located on a base first side surface. The system features a volume up button and a volume down button, a loudspeaker, and a video camera centrally located on a screen bottom surface. The system features a power source and a watch band constructed from titanium and clear plastic. The watch band features suede located on a watch band bottom surface for interfacing with a user.

6 Claims, 5 Drawing Sheets

WATCH, MOBILE TELEPHONE AND VIDEO CAMERA SYSTEM

FIELD OF THE INVENTION

The present invention relates to mobile telephone devices, or more specifically, mobile telephone devices that in combination with a watch are worn on a wrist.

BACKGROUND OF THE INVENTION

Watches have been around for many years as have telephones. With modern technology, many people often use mobile telephones rather than stationary telephones that have been used throughout the 1900s. The present invention features a titanium watch, mobile telephone, and video camera system.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a titanium watch, mobile telephone, and video camera system. In some embodiments, the system comprises a base unit constructed from titanium. In some embodiments, the system comprises a screen unit pivotally located on a base top surface. In some embodiments, the screen unit is adjustable in an arc from 0 to 180 degrees with respect to a base top surface. In some embodiments, the system comprises a time display component located on a screen top surface.

The present invention ("D2") features a camera in a central position located underneath the top portion of the present invention to keep out debri, food, water, and to protect camera lens from cracks and smears. In some embodiments, the top portion of the present invention swivels. In some embodiments, the present invention ("D2") is able to take pictures at all angles. In some embodiments, the system comprises a watch band constructed from titanium, water resistant, and durable. In some embodiments, the system comprises a watch band constructed from transparent plastic. In some embodiments, the system comprises a watch band layered with suede underneath.

In some embodiments, the system comprises a mobile telephone unit located in the base unit. In some embodiments, the mobile telephone unit is designed to make and receive telephone calls. In some embodiments, the mobile telephone unit comprises an illuminated dial pad and a plurality of function keys. In some embodiments, the plurality of function keys is designed to input operating commands into the mobile telephone unit and the microprocessor.

In some embodiments, the system comprises a microphone to receive audio for input into the mobile telephone unit and the microprocessor. In some embodiments, the system comprises a universal serial bus port (USB) to send or receive data to or from the microprocessor and charge a power source. In some embodiments, the system comprises a flash drive designed to send or receive data to or from the microprocessor. In some embodiments, the system comprises a first side cover pivotally located on a base first side surface.

In some embodiments, the system comprises a volume up button and a volume down button. In some embodiments, the system comprises a loudspeaker. In some embodiments, the system comprises a video camera centrally located on a screen bottom surface. In some embodiments, the system comprises a power source. In some embodiments, the system comprises a watch band constructed from titanium and clear plastic. In some embodiments, the watch band comprises suede located on a watch band bottom surface for interfacing with a user.

DESCRIPTION OF PREFERRED EMBODIMENTS

Following is a list of elements corresponding to a particular element referred to herein:

100 Watch system
110 Base unit
111 Base top surface
113 Base anterior side surface
114 Base posterior side surface
115 Base first side surface
116 Base second side surface
120 Screen unit
121 Screen top surface
122 Screen bottom surface
130 Time display component
131 Time power source
140 Microprocessor
150 Mobile telephone unit
151 Dial pad
152 Function key
160 Microphone
170 USB and charger port
180 Flash drive
190 First side cover
200 Volume up button
201 Volume down button
210 Loudspeaker
220 Video camera
230 Power source
240 Watch band
241 First band
242 First band first end
243 Second band
244 Second band first end
246 First butterfly style clip component
247 Second butterfly style clip component
250 Power symbol 260 Memory card
270 Sim card
280 Vibration component
290 Wireless component Referring now to FIG. 1-8, the present invention features a titanium watch system (100) for combining the features of a watch, mobile telephone, and video camera for discreet communication. In some embodiments, the system (100) comprises a base unit (110) having a base top surface (111), a base anterior side surface (113), a base posterior side surface (114), a base first side surface (115), and a base second side surface (116). In some embodiments, the base unit (110) is constructed from titanium. In some embodiments, the base unit (110) is about the size of a watch. In some embodiments, the base unit (110) comprises a cavity located inside.

Figures 1, 2:
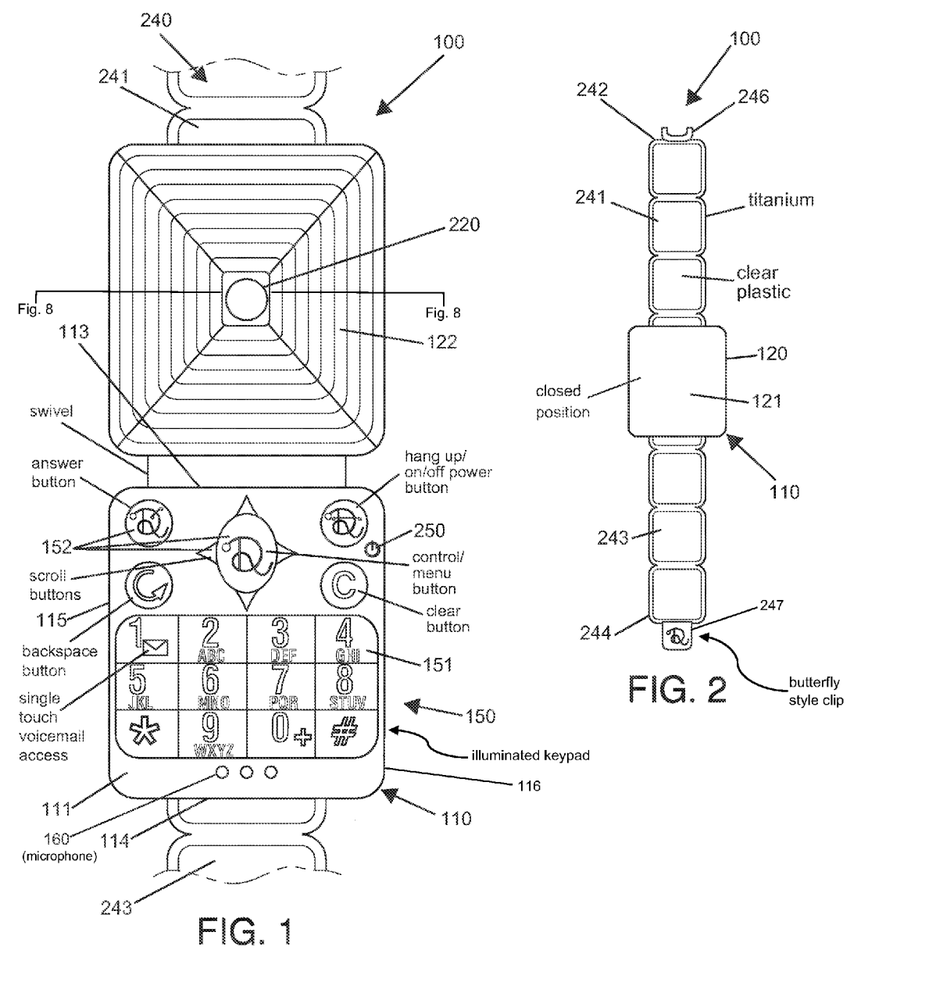
FIG. 1 shows a front view of the present invention with the screen unit in an upward position.
FIG. 2 shows a front view of the present invention with the screen unit in a downward position.

In some embodiments, the system (100) comprises a screen unit (120) having a screen top surface (121) and a screen bottom surface (122). In some embodiments, the screen unit (120) is pivotally located on the base top surface (111). In some embodiments, the screen unit (120) is adjustably positionable in an arc from 0 to 180 degrees with respect to the base top surface (111). In some embodiments, the screen unit (120) is a liquid quartz display. In some embodiments, the screen unit (120) is a touchscreen display. In some embodiments, the screen unit (120) is a light emitting diode display.

In some embodiments, the system (100) comprises a time display component (130) located on the screen top surface (121) or upper right hand of watch. In some embodiments, the time display component (130) is operatively connected to the time power source (131). In some embodiments, the time display component (130) is operatively connected to the power source (230). In some embodiments, the time display component (130) is an analog watch. In some embodiments, the time display component (130) is a digital watch. In some embodiments, the display menu comprises an option to make time show in the upper right hand of watch.

Figure 6:
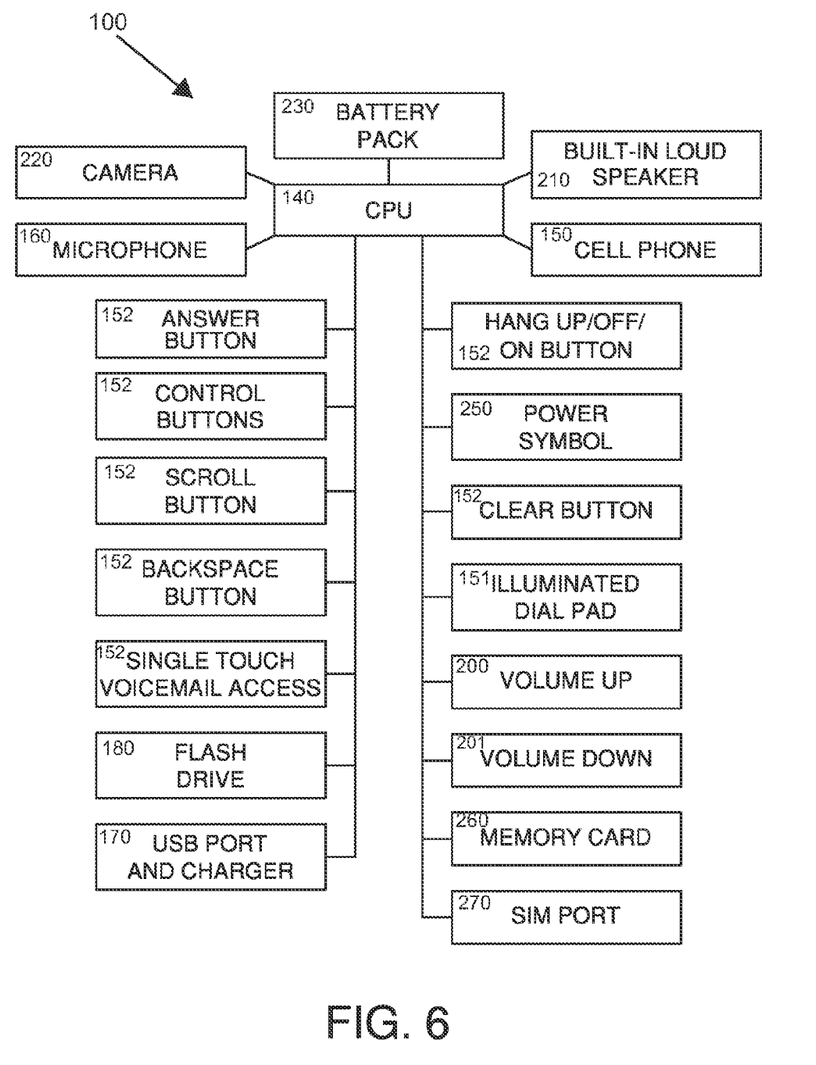
FIG. 6 shows a schematic of the present invention.
Figure 7:
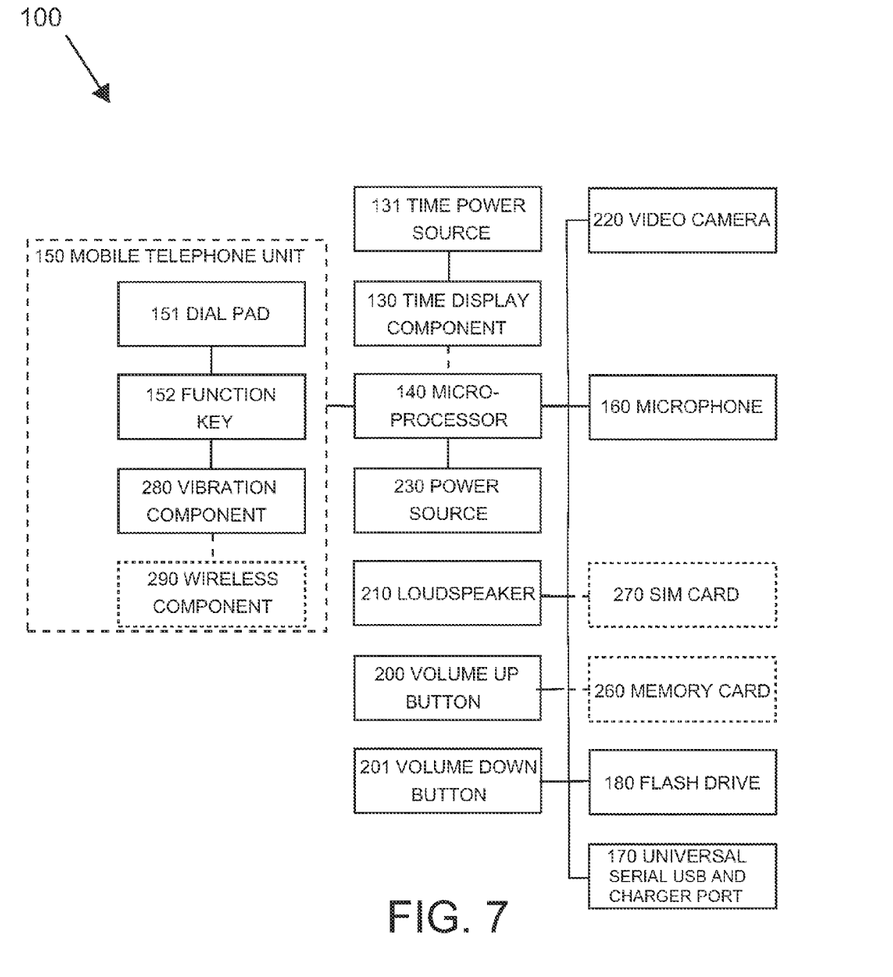
FIG. 7 shows a schematic of an alternate embodiment of the present invention.

In some embodiments, the system (100) comprises a microprocessor (140) located in the base unit (110).

In some embodiments, the system (100) comprises a mobile telephone unit (150) located in the base unit (110). In some embodiments, the mobile telephone unit (150) operates like a typical mobile telephone unit, for example, it can be used to send and receive calls on a telephone system. In some embodiments, the mobile telephone unit (150) is operatively connected to the microprocessor (140). In some embodiments, the mobile telephone unit (150) is designed to make and receive telephone calls. In some embodiments, the mobile telephone unit (150) comprises an illuminated dial pad (151) located on the base top surface (111) close to the base posterior side surface (114). In some embodiments, the dial pad (151) is constructed from a rubber. In some embodiments, the dial pad (151) is designed to input alphanumeric data into the mobile telephone unit (150) and the microprocessor (140).

In some embodiments, the mobile telephone unit (150) comprises a plurality of function keys (152) located on the base top surface (111) close to the base anterior side surface (113). In some embodiments, the function keys (152) are selected from a group consisting of: a power button, an answer button, a hangup button, a plurality of scroll buttons, a backspace button, a single-touch voicemail access button, a control button, a menu button, and a clear button. In some embodiments, function keys (152) may be combined to perform a plurality of functions. In some embodiments, the plurality of function keys (152) is constructed from a rubber. In some embodiments, the plurality of function keys (152) is designed to input operating commands into the mobile telephone unit (150) and the microprocessor (140).

In some embodiments, the system (100) comprises a microphone (160) located on the base top surface (111) close to the base anterior side surface (113) between the plurality of function keys (152) and the base anterior side surface (113). In some embodiments, the microphone (160) is operatively connected to the microprocessor (140). In some embodiments, the microphone (160) is designed to receive an audio for input into the mobile telephone unit (150) and the microprocessor (140).

Figure 4:
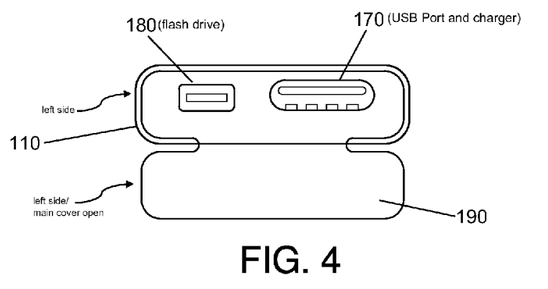
FIG. 4 shows a view of the first side of the present invention.

In some embodiments, the system (100) comprises a universal serial bus (USB) port (170) located on the base first side surface (115). In some embodiments, the universal serial bus port (170) is operatively connected to the microprocessor (140). In some embodiments, the universal serial bus port (170) is designed to send or receive data to or from the microprocessor (140). In some embodiments, the universal serial bus port (170) is designed for charging a power source (230).

In some embodiments, the system (100) comprises a flash drive (180) located on the base first side surface (115). In some embodiments, the flash drive (180) is operatively connected to the microprocessor (140). In some embodiments, the flash drive (180) is designed to send or receive data to or from the microprocessor (140).

Figure 3:
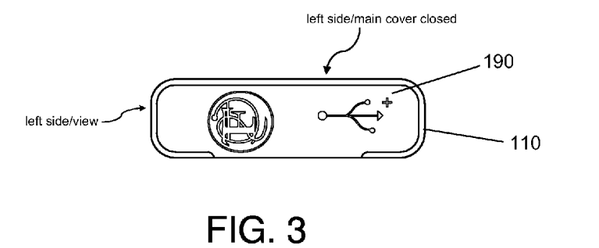
FIG. 3 shows a view of the first side cover of the present invention.

In some embodiments, the system (100) comprises a first side cover (190) pivotally located on the base first side surface (115). In some embodiments, the first side cover (190) is designed to protectively cover the universal serial bus port (170) and the flash drive (180).

Figure 5:
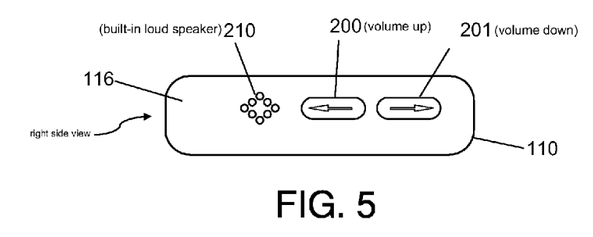
FIG. 5 shows a view of the second side of the present invention.

In some embodiments, the system (100) comprises a volume up button (200) and a volume down button (201) each located on the base second side surface (116). In some embodiments, the volume up button (200) and volume down button (201) are operatively connected to the microprocessor (140). In some embodiments, the volume up button (200) and volume down button (201) are constructed from titanium. In some embodiments, the volume up button (200) and volume down button (201) are designed to respectively increase or decrease the volume of a loudspeaker (210).

In some embodiments, the system (100) comprises the loudspeaker (210) located on the base second side surface (116). In some embodiments, the loudspeaker (210) is operatively connected to the microprocessor (140). In some embodiments, the loudspeaker (210) is designed to emit an audio signal received from the mobile telephone unit (150) or the microprocessor (140).

In some embodiments, the system (100) comprises a video camera (220) centrally located on the screen bottom surface (122). In some embodiments, the video camera (220) is operatively connected to the microprocessor (140). In some embodiments, the video camera (220) is designed to capture a still or a video image for input into the microprocessor (140). In some embodiments, the video camera (220) swivels on a pivoting mount on the screen unit (120) and the base unit (110).

In some embodiments, the system (100) comprises the power source (230) located in the base unit (110). In some embodiments, the power source (230) is operatively connected to the microprocessor (140). In some embodiments, the power source (230) is operatively connected to the mobile telephone unit (150).

In some embodiments, the system (100) comprises a vibration component (280) located in the base unit (110). In some embodiments, the vibration component (280) is operatively connected to the microprocessor (140). In some embodiments, the vibration component (280) vibrates upon receiving an incoming call for the mobile telephone unit (150). In some embodiments, the loudspeaker (210) emits a sound upon receiving an incoming call for the mobile telephone unit (150).

Figure 8:
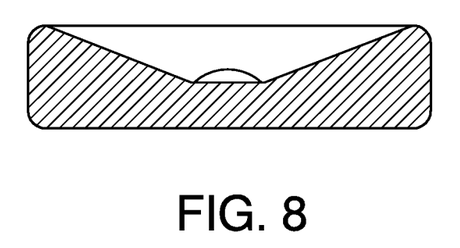
FIG. 8 shows a cross section of the bottom surface of the present invention.

In some embodiments, the system (100) comprises a watch band (240) having first band pivotally located on a base anterior side surface (113) and a second band (243) located on a base posterior side surface (114). In some embodiments, the watch band (240) is constructed from titanium and clear plastic. In some embodiments, the watch band (240) is constructed from units of clear plastic surrounded by a titanium frame, linked together. In some embodiments, the watch band (240) comprises suede located on a watch band (240) bottom surface for interfacing with a user. In some embodiments, the suede is leather. In some embodiments, the suede layer underneath the plastic is critical to the longevity of the watch band (240) and the comfort for the wearer. In some embodiments, the first band (241) comprises a first butterfly style clip component (246) located on a terminating first band first end (242) and a second butterfly style clip component (247) located on a terminating second band first end (244). In some embodiments, the first butterfly style clip component (246) and the second butterfly style clip component (247) attachably connect to form a loop around a wrist of the user.

In some embodiments, for making a telephone call, the power key is activated to energize the system (100). In some embodiments, a phone number of a recipient is entered via the dial pad (151). In some embodiments, the answer button is activated to perform the call. In some embodiments, upon activation of the answer button, a first signal is transmitted to a mobile telephone receiving system, thereby placing a telephone call.

In some embodiments, for receiving a telephone call, a second signal is received from a mobile telephone transmitting system. In some embodiments, the second signal activates the vibration component (280) or the loudspeaker (210) for notifying the user of the incoming call. In some embodiments, the answer button is activated by the user to receive the call. In some embodiments, upon activation of the answer button, the user speaks into the microphone (160) to generate a first sound for transmission via the mobile telephone transmitting system. In some embodiments, the user listens to the loudspeaker (210) to hear a second sound that has been transmitted from the mobile telephone receiving system.

In some embodiments, the video camera (220) is activated via the function keys (152). In some embodiments, the video camera (220) captures still and video images for input into the microprocessor (140). In some embodiments, the still images and video images are displayed on the screen top surface (121). In some embodiments, the video camera (220) is used in conjunction with the mobile telephone unit (250) for video telephone calls, teleconferencing or videoconferencing.

In some embodiments, a power symbol (250) is located on the base top surface (111).

In some embodiments, a memory card (260) is located in a memory card slot. In some embodiments, the memory card slot is located in the base unit (110). In some embodiments, upon insertion, the memory card (260) is operatively connected to the microprocessor (140) via the memory card slot for providing data storage capacity for the system (100).

In some embodiments, a sim card (270) is located in a sim card slot. In some embodiments, the sim card slot is located in the base unit (110). In some embodiments, upon insertion, the sim card (270) is operatively connected to the microprocessor (140) via the sim card slot for providing data storage capacity for the system (100).

In some embodiments, the system (100) comprises a wireless component (290) operatively connected to the microprocessor (140). In some embodiments, the wireless component (290) is designed to wirelessly and operatively connect an accessory, receive a file, or transfer a file. In some embodiments, the wireless component uses radio frequency transmission or Bluetooth™ technology.

In some embodiments, the power source (230) is the time power source (131).

As used herein, the term "about" refers to plus or minus 10% of the referenced number.

The disclosures of the following U.S. Patents are incorporated in their entirety by reference herein: U.S. Pat. No. D 565,427; U.S. Patent Pub. No. 2003/0194084; U.S. Patent Pub. No. 200/30155389; U.S. Patent Pub. No. 2003/0125077; U.S. Pat. No. 7,509,094; U.S. Pat. No. 7,424,316; U.S. Pat. No. 7,280,844; U.S. Pat. No. 6,801,476; U.S. Pat. No. 6,707,764; and U.S. Pat. No. 6,535,605.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A titanium watch system (100) for combining the features of a watch, mobile telephone, and video camera for discreet communication, wherein the system (100) comprises:
   (a) a base unit (110) having a base top surface (111), a base anterior side surface (113), a base posterior side surface (114), a base first side surface (115), and a base second side surface (116), wherein the base unit (110) is constructed from titanium;
   (b) a screen unit (120) having a screen top surface (121) and a screen bottom surface (122), wherein the screen unit (120) is pivotally disposed on the base top surface (111), wherein the screen unit (120) is adjustably positionable in an arc from 0 to 180 degrees with respect to the base top surface (111);
   (c) a time display component (130) disposed on the screen top surface (121), wherein the time display component (130) is operatively connected to a time power source (131);

(d) a microprocessor (140) disposed in the base unit (110);

(e) a mobile telephone unit (150) disposed in the base unit (110), wherein the mobile telephone unit (150) is operatively connected to the microprocessor (140), wherein the mobile telephone unit (150) is designed to make and receive telephone calls, wherein the mobile telephone unit (150) comprises:

(i) an illuminated dial pad (151) disposed on the base top surface (111) proximal to the base posterior side surface (114), wherein the dial pad (151) is constructed from a rubber, wherein the dial pad (151) is designed to input alphanumeric data into the mobile telephone unit (150) and the microprocessor (140), and (ii) a plurality of function keys (152) disposed on the base top surface (111) proximal to the base anterior side surface (113), wherein the function keys (152) are selected from a group consisting of: a power button, an answer button, a hangup button, a plurality of scroll buttons, a backspace button, a single-touch voicemail access button, a control button, a menu button, and a clear button, wherein function keys (152) may be combined to perform a plurality of functions, wherein the plurality of function keys (152) is constructed from a rubber, wherein the plurality of function keys (152) is designed to input operating commands into the mobile telephone unit (150) and the microprocessor (140);

(f) a microphone (160) disposed on the base top surface (111) proximal to the base anterior side surface (113) between the plurality of function keys (152) and the base anterior side surface (113), wherein the microphone (160) is operatively connected to the microprocessor (140), wherein the microphone (160) is designed to receive an audio for input into the mobile telephone unit (150) and the microprocessor (140);

(g) a universal serial bus port (170) disposed on the base first side surface (115), wherein the universal serial bus port (170) is operatively connected to the microprocessor (140), wherein the universal serial bus port (170) is designed to send or receive data to or from the microprocessor (140), wherein the universal serial bus port (170) is designed for charging a power source (230);

(h) a flash drive (180) disposed on the base first side surface (115), wherein the flash drive (180) is operatively connected to the microprocessor (140), wherein flash drive (180) is designed to send or receive data to or from the microprocessor (140);

(i) a first side cover (190) pivotally disposed on the base first side surface (115), wherein the first side cover (190) is designed to protectively cover the universal serial bus and charger port (170) and the flash drive (180);

(j) a volume up button (200) and a volume down button (201) each disposed on the base second side surface (116), wherein the volume up button (200) and volume down button (201) are operatively connected to the microprocessor (140), wherein the volume up button (200) and volume down button (201) are constructed from titanium, wherein the volume up button (200) and volume down button (201) are designed to respectively increase or decrease the volume of a loudspeaker (210);

(k) the loudspeaker (210) disposed on the base second side surface (116), wherein the loudspeaker (210) is operatively connected to the microprocessor (140), wherein the loudspeaker (210) is designed to emit an audio signal received from the mobile telephone unit (150) or the microprocessor (140);

(l) a video camera (220) centrally disposed on the screen bottom surface (122), wherein the video camera (220) is operatively connected to the microprocessor (140), wherein the video camera (220) is designed to capture a still or a video image for input into the microprocessor (140);

(m) the power source (230) disposed in the base unit (110), wherein the power source (230) is operatively connected to the microprocessor (140);

(n) a vibration component (280) is disposed in the base unit (110), wherein the vibration component (280) is operatively connected to the microprocessor (140), wherein the vibration component (280) vibrates upon receiving an incoming call for the mobile telephone unit (150);

(o) a watch band (240) having a first band (241) pivotally disposed on a base anterior side surface (113) and a second band (243) disposed on a base posterior side surface (114), wherein the watch band (240) is constructed from titanium and clear plastic, wherein the watch band (240) comprises suede disposed on a watch band (240) bottom surface for interfacing with a user, wherein the first band (241) comprises a first butterfly style clip component (246) disposed on a terminating first band first end (242), and a second butterfly style clip component (247) disposed on a terminating second band first end (244), wherein the first butterfly style clip component (246) and the second butterfly style clip component (247) attachably connect to form a loop around a wrist of the user;

wherein for making a telephone call, the power key is activated to energize the system (100), wherein a phone number of a recipient is entered via the dial pad (151), wherein the answer button is activated to perform the call, wherein upon activation of the answer button, a first signal is transmitted to a mobile telephone receiving system, wherein for receiving a telephone call, a second signal is received from a mobile telephone transmitting system, wherein the second signal activates the vibration component (280) for notifying the user of the incoming call, wherein the answer button is activated by the user to receive the call, wherein upon activation of the answer button, the user speaks into the microphone (160) to generate a first sound for transmission via the mobile telephone transmitting system, wherein the user listens to the loudspeaker (210) to hear a second sound that has been transmitted from the mobile telephone receiving system;

wherein the video camera (220) is activated via the function keys (152), wherein the video camera (220) captures still and video images for input into the microprocessor (140), wherein the still images and video images are displayed on the screen top surface (121).

2. The system (100) of claim 1, wherein a power symbol (250) is disposed on the base top surface (111).

3. The system (100) of claim 1, wherein a memory card (260) is disposed in a memory card slot, wherein the memory card slot is disposed in the base unit (110), wherein upon insertion, the memory card (260) is operatively connected to the microprocessor (140) for providing data storage capacity for the system (100).

4. The system (100) of claim 1, wherein a sim card (270) is disposed in a sim card slot, wherein the sim card slot is disposed in the base unit (110), wherein upon insertion, the sim card (270) is operatively connected to the microprocessor (140) for providing data storage capacity for the system (100).

5. The system (100) of claim 1, wherein the system (100) comprises a wireless component (290) operatively connected to the microprocessor (140), wherein the wireless component (290) is designed to wirelessly and operatively connect an accessory, receive a file, or transfer a file.

6. The system (100) of claim 1, wherein the power source (230) is the time power source (131).

* * * * *